(12) United States Patent
Lee et al.

(10) Patent No.: US 8,452,175 B2
(45) Date of Patent: May 28, 2013

(54) METHOD FOR GENERALIZED MULTI-PROTOCOL LABEL SWITCHING ROUTING TO SUPPORT WAVELENGTH SWITCHED OPTICAL NETWORK SIGNAL CHARACTERISTICS AND NETWORK ELEMENT COMPATIBILITY CONSTRAINTS

(75) Inventors: Young Lee, Plano, TX (US); Greg Bernstein, Fremont, CA (US)

(73) Assignee: Futurewei Technologies, Inc., Plano, TX (US)

( * ) Notice: Subject to any disclaimer, the term of this patent is extended or adjusted under 35 U.S.C. 154(b) by 317 days.

(21) Appl. No.: 12/907,697

(22) Filed: Oct. 19, 2010

(65) Prior Publication Data

US 2011/0091202 A1    Apr. 21, 2011

Related U.S. Application Data

(60) Provisional application No. 61/252,980, filed on Oct. 19, 2009.

(51) Int. Cl.
*H04J 14/00* (2006.01)

(52) U.S. Cl.
USPC .................................. 398/45; 398/48; 398/49

(58) Field of Classification Search
USPC .......................................... 398/19–28, 45–50
See application file for complete search history.

(56) References Cited

U.S. PATENT DOCUMENTS

| | | | |
|---|---|---|---|
| 6,985,959 B1 * | 1/2006 | Lee ................................ | 709/238 |
| 2003/0219015 A1 | 11/2003 | Constant Six et al. | |
| 2011/0081148 A1 * | 4/2011 | Lee et al. ........................ | 398/48 |
| 2012/0148234 A1 * | 6/2012 | Bellagamba et al. ........... | 398/28 |

FOREIGN PATENT DOCUMENTS

| | | |
|---|---|---|
| CN | 1459961 A | 12/2003 |
| CN | 1913410 A | 2/2007 |
| CN | 101047470 A | 10/2007 |
| KR | 20010048327 A | 6/2001 |
| WO | 2011049962 A1 | 4/2011 |

OTHER PUBLICATIONS

Bernstein, Greg, et al., "Routing and Wavelength Assignment Information for Wavelength Switched Optical Networks," draft-bernstein-ccamp-wson-info-00.txt, Oct. 30, 2007.

Bernstein, Greg, et al., "Routing and Wavelength Assignment Information for Wavelength Switched Optical Networks," draft-bernstein-ccamp-wson-info-01.txt, Nov. 19, 2007.

(Continued)

*Primary Examiner* — Dzung Tran
(74) *Attorney, Agent, or Firm* — Conley Rose, P.C.; Grant Rodolph; Brandt Howell

(57) ABSTRACT

An apparatus comprising a network element (NE) configured to support routing-associated signal compatibility constraint information that is associated with the NE using Generalized Multi-Protocol Label Switching (GMPLS) and an open shortest path first (OSPF) routing protocol, wherein the signal compatibility constraint information comprises a modulation type list, a Forward Error Correction (FEC) type list, a bit rate range list, and an acceptable client signal list, and wherein the signal compatibility constraint information is associated with a resource block (RB) pool for a plurality of NEs. Also disclosed is a network component comprising a transmitter unit configured to transmit signal compatibility constraints via GMPLS OSPF routing, wherein the signal compatibility constraints comprise a modulation type list, a FEC type list, a bit rate range list, and an acceptable client signal list.

18 Claims, 10 Drawing Sheets

OTHER PUBLICATIONS

Bernstein, Greg, et al., "Routing and Wavelength Assignment Information for Wavelength Switched Optical Networks," draft-bernstein-ccamp-wson-info-02.txt, Feb. 20, 2008.

Bernstein, Greg, et al., "Routing and Wavelength Assignment Information for Wavelength Switched Optical Networks," draft-bernstein-ccamp-wson-info-03.txt, Jul. 7, 2008.

Bernstein, G., et al., "Routing and Wavelength Assignment Information Encoding for Wavelength Switched Optical Networks," draft-ietf-ccamp-rwa-wson-encode-00.txt, Dec. 18, 2008.

Bernstein, G., et al., "Routing and Wavelength Assignment Information Encoding for Wavelength Switched Optical Networks," draft-ietf-ccamp-rwa-wson-encode-01.txt, Mar. 3, 2009.

Bernstein, G., et al., "Routing and Wavelength Assignment Information Encoding for Wavelength Switched Optical Networks," draft-ietf-ccamp-rwa-wson-encode-02.txt, Jul. 10, 2009.

Bernstein, G., et al., "Routing and Wavelength Assignment Information Encoding for Wavelength Switched Optical Networks," draft-ietf-ccamp-rwa-wson-encode-03.txt, Oct. 8, 2009.

Bernstein, G., et al., "Routing and Wavelength Assignment Information Encoding for Wavelength Switched Optical Networks," draft-ietf-ccamp-rwa-wson-encode-04.txt, Feb. 18, 2010.

Bernstein, G., et al., "Routing and Wavelength Assignment Information Encoding for Wavelength Switched Optical Networks," draft-ietf-ccamp-rwa-wson-encode-05.txt, Jul. 12, 2010.

Bernstein, G., et al., "Routing and Wavelength Assignment Information Encoding for Wavelength Switched Optical Networks," draft-ietf-ccamp-rwa-wson-encode-06.txt, Oct. 13, 2010.

Bernstein, G., et al., "WSON Signal Characteristics and Network Element Compatibility Constraints for GMPLS," draft-bernstein-ccamp-wson-compatibility-01.txt, Oct. 7, 2009.

Bernstein, G., et al., "WSON Signal Characteristics and Network Element Compatibility Constraints for GMPLS," draft-bernstein-ccamp-wson-compatibility-00.txt, Aug. 17, 2009.

Lee, Y., et al., A Framework for the Control of Wavelength Switched Optical Networks (WSON) with Impairments, draft-ietf-ccamp-wson-impairments-00.txt, Jun. 29, 2009.

Lee, Y., et al., A Framework for the Control of Wavelength Switched Optical Networks (WSON) with Impairments, draft-ietf-ccamp-wson-impairments-01.txt, Oct. 22, 2009.

Lee, Y., et al., A Framework for the Control of Wavelength Switched Optical Networks (WSON) with Impairments, draft-ietf-ccamp-wson-impairments-02.txt, May 20, 2010.

Lee, Y., et al., A Framework for the Control of Wavelength Switched Optical Networks (WSON) with Impairments, draft-ietf-ccamp-wson-impairments-03.txt, Jul. 9, 2010.

Lee, Y. et al., "Framework for GMPLS and PCE Control of Wavelength Switched Optical Networks (WSON)," draft-ietf-ccamp-rwa-wson-framework-00.txt, Dec. 5, 2008.

Lee, Y. et al., "Framework for GMPLS and PCE Control of Wavelength Switched Optical Networks (WSON)," draft-ietf-ccamp-rwa-wson-framework-01.txt, Feb. 9, 2009.

Lee, Y. et al., "Framework for GMPLS and PCE Control of Wavelength Switched Optical Networks (WSON)," draft-ietf-ccamp-rwa-wson-framework-02.txt, Mar. 4, 2009.

Lee, Y. et al., "Framework for GMPLS and PCE Control of Wavelength Switched Optical Networks (WSON)," draft-ietf-ccamp-rwa-wson-framework-03.txt, Sep. 8, 2009.

Lee, Y. et al., "Framework for GMPLS and PCE Control of Wavelength Switched Optical Networks (WSON)," draft-ietf-ccamp-rwa-wson-framework-04.txt, Oct. 9, 2009.

Lee, Y., et al., "Framework for GMPLS and PCE Control of Wavelength Switched Optical Networks (WSON)," draft-ietf-ccamp-rwa-wson-framework-05.txt, Feb. 1, 2010.

Lee, Y., et al., "Framework for GMPLS and PCE Control of Wavelength Switched Optical Networks (WSON)," draft-ietf-ccamp-rwa-wson-framework-06.txt, Apr. 5, 2010.

Lee, Y., et al., "Framework for GMPLS and PCE Control of Wavelength Switched Optical Networks (WSON)," draft-ietf-ccamp-rwa-wson-framework-07.txt, Oct. 8, 2010.

Lee, Y, et al., "OSPF Enhancement for Signal and Network Element Compatibility for Wavelength Switched Optical Networks," draft-lee-ccamp-wson-signal-compatibility-ospf-00.txt, Oct. 12, 2009.

Otani, Tomohiro, et al., "Generalized Labels for G.694 Lambda-Switching Capable Label Switching Routers," draft-ietf-ccamp-gmpls-g-694-lambda-labels-00.txt, May 27, 2008.

Otani, Tomohiro, et al., "Generalized Labels for G.694 Lambda-Switching Capable Label Switching Routers," draft-ietf-ccamp-gmpls-g-694-lambda-labels-01.txt, May 27, 2008.

Otani, Tomohiro, et al., "Generalized Labels for G.694 Lambda-Switching Capable Label Switching Routers," draft-ietf-ccamp-gmpls-g-694-lambda-labels-02.txt, Jul. 14, 2008.

Otani, Tomohiro, et al., "Generalized Labels for G.694 Lambda-Switching Capable Label Switching Routers," draft-ietf-ccamp-gmpls-g-694-lambda-labels-03.txt, Jan. 13, 2009.

Otani, Tomohiro, et al., "Generalized Labels for G.694 Lambda-Switching Capable Label Switching Routers," draft-ietf-ccamp-gmpls-g-694-lambda-labels-04.txt, Mar. 23, 2009.

Otani, Tomohiro, et al., "Generalized Labels for G.694 Lambda-Switching Capable Label Switching Routers," draft-ietf-ccamp-gmpls-g-694-lambda-labels-05.txt, Dec. 7, 2009.

Otani, Tomohiro, et al., "Generalized Labels for G.694 Lambda-Switching Capable Label Switching Routers," draft-ietf-ccamp-gmpls-g-694-lambda-labels-06.txt, Mar. 19, 2010.

Otani, Tomohiro, et al., "Generalized Labels for G.694 Lambda-Switching Capable Label Switching Routers," draft-ietf-ccamp-gmpls-g-694-lambda-labels-07.txt, Apr. 8, 2010.

Sambo, Nicola, et al., "GMPLS-Controlled Dynamic Translucent Optical Networks," IEEE Network, May/Jun. 2009, pp. 34-40.

Sen, Arunabha, et al., "On Sparse Placement of Regenerator Nodes in Translucent Optical Networks," IEEE Globecom, 2008, 6 pages.

Shen, Gangxiang, et al., "Translucent Optical Networks: The Way Forward," IEEE Communications Magazine, Feb. 2007, pp. 48-54.

Yang, Xi, et al., "Dyamic Routing in Translucent WDM Optical Networks: The Intradomain Case," Journal of Lightwave Technology, vol. 23, Mar. 2005, pp. 955-971.

ITU-T, "Series G: Transmission Systems and Media, Digital Systems and Networks, Transmission Media Characteristics—Optical Fibre Cables, Characteristics of a Single-mode Optical Fibre and Cable," G.652, Jun. 2005, 20 pages.

ITU-T, "Series G: Transmission Systems and Media, Digital Systems and Networks, Transmission Media Characteristics—Optical Fibre Cables, Characteristics of a Dispersion-shifted Single-mode Optical Fibre and Cable," G.653, Dec. 2006, 20 pages.

ITU-T, "Series G: Transmission Systems and Media, Digital Systems and Networks, Transmission Media Characteristics—Optical Fibre Cables, Characteristics of a Cut-off Shifted Single-mode Optical Fibre and Cable," G.654, Dec. 2006, 20 pages.

ITU-T, "Series G: Transmission Systems and Media, Digital Systems and Networks, Transmission Media Characteristics—Optical Fibre Cables, Characteristics of a Non-zero Dispersion-shifted Single-mode Optical Fibre and Cable," G.655, Mar. 2006, 23 pages.

ITU-T, "Series G: Transmission Systems and Media, Digital Systems and Networks, Transmission Media Characteristics—Optical Fibre Cables, Characteristics of a Fibre and Cable with Non-zero Dispersion for Wideband Optical Transport," G.656, Dec. 2006, 18 pages.

ITU-T, "Series G: Transmission Systems and Media, Digital Systems and Networks, Transmission Media Characteristics—Characteristics of Optical Components and Subsystems, Spectral Grids for WDM Applications: DWDM Frequency Grid," G.694.1, Jun. 2002, 11 pages.

ITU-T, "Series G: Transmission Systems and Media, Digital Systems and Networks, Transmission Media Characteristics—Characteristics of Optical Components and Subsystem, Spectral Grids for WDM Applications: CWDM Wavelength Grid," G.694.2, Dec. 2003, 10 pages.

ITU-T, "Series G: Transmission Systems and Media, Digital Systems and Networks, Digital Terminal Equipments—General, Series Y: Global Information Infrastructure, Internet Protocol Aspects and Next Generation Networks Internet Protocol Aspects—Transport, Network Node Interface for the Synchronous Digital Hierarchy (SDH)," G.7071Y.1322, Jan. 2007, 196 pages.

ITU-T, "Series G: Transmission Systems and Media, Digital Systems and Networks, Digital Terminal Equipments—General, Series Y: Global Information Infrastructure, Internet Protocol Aspects and Next Generation Networks Internet Protocol Aspects—Transport, Interfaces for the Optical Transport Network (OTN)," G709/Y.1331, Mar. 2003, 118 pages.

ITU-T, "Series G: Transmission Systems and Media, Digital Systems and Networks, Digital Networks—Optical Transport Networks, Architecture of Optical Transport Networks," G.872, Nov. 2001, 72 pages.

ITU-T, "Series G: Transmission Systems and Media, Digital Systems and Networks, Digital Sections and Digital Line System—Digital Line Systems, Optical Transport Network Physical Layer Interfaces," G.959.1, Mar. 2006, 57 pages.

ITU-T, "Series G: Transmission Systems and Media, Digital Systems and Networks, Digital Sections and Digital Line System—Optical Fibre Submarine Cable Systems, Forward Error Correction for High Bit-rate DWDM Submarine Systems," G.975.1, Feb. 2004, 58 pages.

Bradner, S., "Key Words for Use in RFCs to Indicate Requirement Levels," RFC 2119, Mar. 1997.

McCloghire, K., et al., "Structure of Management Information Version 2 (SMIv2)," RFC 2578, Apr. 1999.

Berger, L., "Generalized Multi-Protocol Label Switching (GMPLS) Signaling Function Description," RFC 3471, Jan. 2003.

Kompella, K., et al., "Routing Extensions in Support of Generalized Multi-Protocol Label Switching (GMPLS)," RFC 4202, Oct. 2005.

Kompella, K., et al., "OSPF Extensions in Support of Generalized Multi-Protocol Label Switching (GMPLS)," RFC 4203, Oct. 2005.

Papadimitriou, D., "Generalized Multi-Protocol Label Switching (GMPLS) Signaling Extensions for G.709 Optical Transport Networks Control," RFC 4328, Jan. 2006.

Shiomoto, K., et al., "Requirments for GMPLS-Based Multi-Region and Multi-Layer Networks (MRN/MLN)," RFC 5212, Jul. 2008.

Kompella, K. et al., "IS-IS Extensions in Support of Generalized Multi-Protocol Label Switching (GMPLS)," RFC 5307, Oct. 2008.

Vasseur, J.P., et al., "Path Computation Elemnet (PCE) Communication Protocol (PCEP)," RFC 5440, Mar. 2009.

Foreign Communication From a Related Counterpart Application—PCT Application PCT/US2010/053220, Partial International Search Report, Dec. 29, 2010, 4 pages.

Foreign Communication From a Related Counterpart Application—PCT Application PCT/US2010/053220, Written Opinion, Dec. 29, 2010, 6 pages.

Lee, Y., et al., "OSPF Enhancement for Signal and Network Element Compatibility for Wavelength Switrched Optical Networks," draft-ietf-ccamp-wson-signal-compatibility-ospf-00.txt, Dec. 8, 2009, 16 pages.

Lee, Y., et al., "OSPF Enhancement for Signal and Network Element Compatibility for Wavelength Switrched Optical Networks," draft-ietf-ccamp-wson-signal-compatibility-ospf-01.txt, Mar. 5, 2010, 10 pages.

Lee, Y., et al., "OSPF Enhancement for Signal and Network Element Compatibility for Wavelength Switrched Optical Networks," draft-ietf-ccamp-wson-signal-compatibility-ospf-02.txt, Sep. 2, 2010, 11 pages.

Bernstein, G., et al., "Routing and Wavelength Assignment Information Model for Wavelength Switched optical Networks," draft-ietf-ccamp-rwa-info-00.txt, Aug. 29, 2008, 30 pages.

Bernstein, G., et al., "Routing and Wavelength Assignment Information Model for Wavelength Switched optical Networks," draft-ietf-ccamp-rwa-info-01.txt, Nov. 3, 2008, 34 pages.

Lee, Y., et al., "Routing and Wavelength Assignment Information Model for Wavelength Switched optical Networks," draft-ietf-ccamp-rwa-info-02.txt, Mar. 3, 2009, 34 pages.

Lee, Y., et al., "Routing and Wavelength Assignment Information Model for Wavelength Switched optical Networks," draft-ietf-ccamp-rwa-info-03.txt, Jul. 10, 2009, 38 pages.

Lee, Y., et al., "Routing and Wavelength Assignment Information Model for Wavelength Switched optical Networks," draft-ietf-ccamp-rwa-info-04.txt, Sep. 9, 2009, 20 pages.

Lee, Y., et al., "Routing and Wavelength Assignment Information Model for Wavelength Switched optical Networks," draft-ietf-ccamp-rwa-info-05.txt, Oct. 9, 2009, 36 pages.

Lee, Y., et al., "Routing and Wavelength Assignment Information Model for Wavelength Switched optical Networks," draft-ietf-ccamp-rwa-info-06.txt, Feb. 8, 2010, 23 pages.

Lee, Y., et al., "Routing and Wavelength Assignment Information Model for Wavelength Switched optical Networks," draft-ietf-ccamp-rwa-info-07.txt, Feb. 18, 2010, 23 pages.

Lee, Y. et al., "Routing and Wavelength Assignment Information Model for Wavelength Switched optical Networks," draft-ietf-ccamp-rwa-info-08.txt, Jul. 12, 2010, 48 pages.

Lee, Y., et al., "Routing and Wavelength Assignment Information Model for Wavelength Switched optical Networks," draft-ietf-ccamp-rwa-info-09.txt, Sep. 3, 2010, 52 pages.

Katz, D., et al., "Traffic Engineering (TE) Extensions to OSPF Version 2," RFC 3630, Sep. 2003, 124 pages.

Bernstein, G., et al., "General Network Element Constraint Encoding for GMPLS Controlled Networks," Network Working Group, Internet Draft, draft-ietf-ccamp-general-constraint-encode-03.txt, Oct. 13, 2010, 30 pages.

Aggarwal, R., et al., "Advertising a Router's Local Addresses in OSPF TE Extensions," Network Working Group, Internet Draft, draft-ietf-ospf-te-node-addr-06.txt, May 4, 2009, 9 pages.

Berger, L., et al., "The OSPF Opaque LSA Option," Network Working Group, RFC 5250, Jul. 2008, 18 pages.

Aggarwal, R., et al., "Advertising a Router's Local Addresses in OSPF TE Extensions," IETF, RFC 5786, Mar. 2010, 8 pages.

* cited by examiner

METHOD FOR GENERALIZED MULTI-PROTOCOL LABEL SWITCHING ROUTING TO SUPPORT WAVELENGTH SWITCHED OPTICAL NETWORK SIGNAL CHARACTERISTICS AND NETWORK ELEMENT COMPATIBILITY CONSTRAINTS

CROSS-REFERENCE TO RELATED APPLICATIONS

The present application claims priority to U.S. Provisional Patent Application No. 61/252,980 filed Oct. 19, 2009 by Young Lee et al. and entitled "Method of GMPLS Routing to Support WSON Signal Characteristics and Network Element Compatibility Constraints," both of which are incorporated herein by reference as if reproduced in their entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Wavelength division multiplexing (WDM) is one technology that is envisioned to increase bandwidth capability and enable bi-directional communications in optical networks. In WDM networks, multiple data signals can be transmitted simultaneously between network elements (NEs) using a single fiber. Specifically, the individual signals may be assigned different transmission wavelengths so that they do not interfere or collide with each other. The path that the signal takes through the network is referred to as the lightpath. One type of WDM network, a wavelength switched optical network (WSON), seeks to switch the optical signals with fewer optical-electrical-optical (OEO) conversions along the lightpath, e.g. at the individual NEs, than existing optical networks. One of the challenges in implementing WSONs is the determination of the routing and wavelength assignment (RWA) for the various signals that are being transported through the network at any given time. To implement RWA, various NE related information can be forwarded from a Path Computation Client (PCC), such as a NE, and received and processed at a Path Computation Element (PCE).

SUMMARY

In one embodiment, the disclosure includes an apparatus comprising a NE configured to support routing-associated signal compatibility constraint information that is associated with the NE using Generalized Multi-Protocol Label Switching (GMPLS) and an open shortest path first (OSPF) routing protocol, wherein the signal compatibility constraint information comprises a modulation type list, a Forward Error Correction (FEC) type list, a bit rate range list, and an acceptable client signal list, and wherein the signal compatibility constraint information is associated with a resource block (RB) pool for a plurality of NEs.

In another embodiment, the disclosure includes a network component comprising a transmitter unit configured to transmit signal compatibility constraints via GMPLS OSPF routing, wherein the signal compatibility constraints comprise a modulation type list, a FEC type list, a bit rate range list, and an acceptable client signal list.

In yet another embodiment, the disclosure includes a method comprising receiving a plurality of signal compatibility constraints and signal characteristics for a NE in a WSON via GMPLS OSPF routing, wherein the signal compatibility constraints comprise a modulation type list, a FEC type list, a bit rate range list, an acceptable client signal list, and a processing capability list.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any quantity of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

GMPLS for WSON may support a plurality of types of wavelength switching systems. For hybrid electro-optical systems, such as optical-electrical-optical (OEO) switches, regenerators, and/or wavelength converters, the GMPLS control plane may be restricted to processing WSON signals with specific characteristics or attributes. In some cases, the WSON may comprise a limited quantity of NEs that may be configured to process one compatible class of signals. Such implementation may limit the WSON flexibility and prevent the efficient use of some NEs, such as regenerators, OEO switches, and wavelength converters. In other cases, the processing capability of some NEs may not be directly supported or used during signal routing. For example, performing a regeneration function on a signal may require provisioning during the optical path establishment process.

Disclosed herein is a system and methods for extending the GMPLS control plane to allow different signal types in WSONs or WDM networks, based on a plurality of signal compatibility constraints for a plurality of NEs. The system and methods include extending GMPLS routing mechanisms in hybrid electro-optical systems, where not all of the optical signals may be compatible with all the NEs. The GMPLS OSPF routing protocol may be extended to support signal compatibility constraints associated with a plurality of different NEs, such as OEO switches, regenerators, and/or wavelength converters. Accordingly, a plurality of TLVs may be used to forward a plurality of NE signal compatibility constraints between the NEs. The NEs may also exchange other related information, such as a plurality of signal characteristics or attributes. The forwarded NE signal compatibility constraints and signal attributes may be used as part of the RWA information to establish paths between the NEs. The NE signal compatibility constraints and the signal attributes may guarantee that the calculated paths forward only signal types that are compatible with the NEs along the paths.

Figure 1:
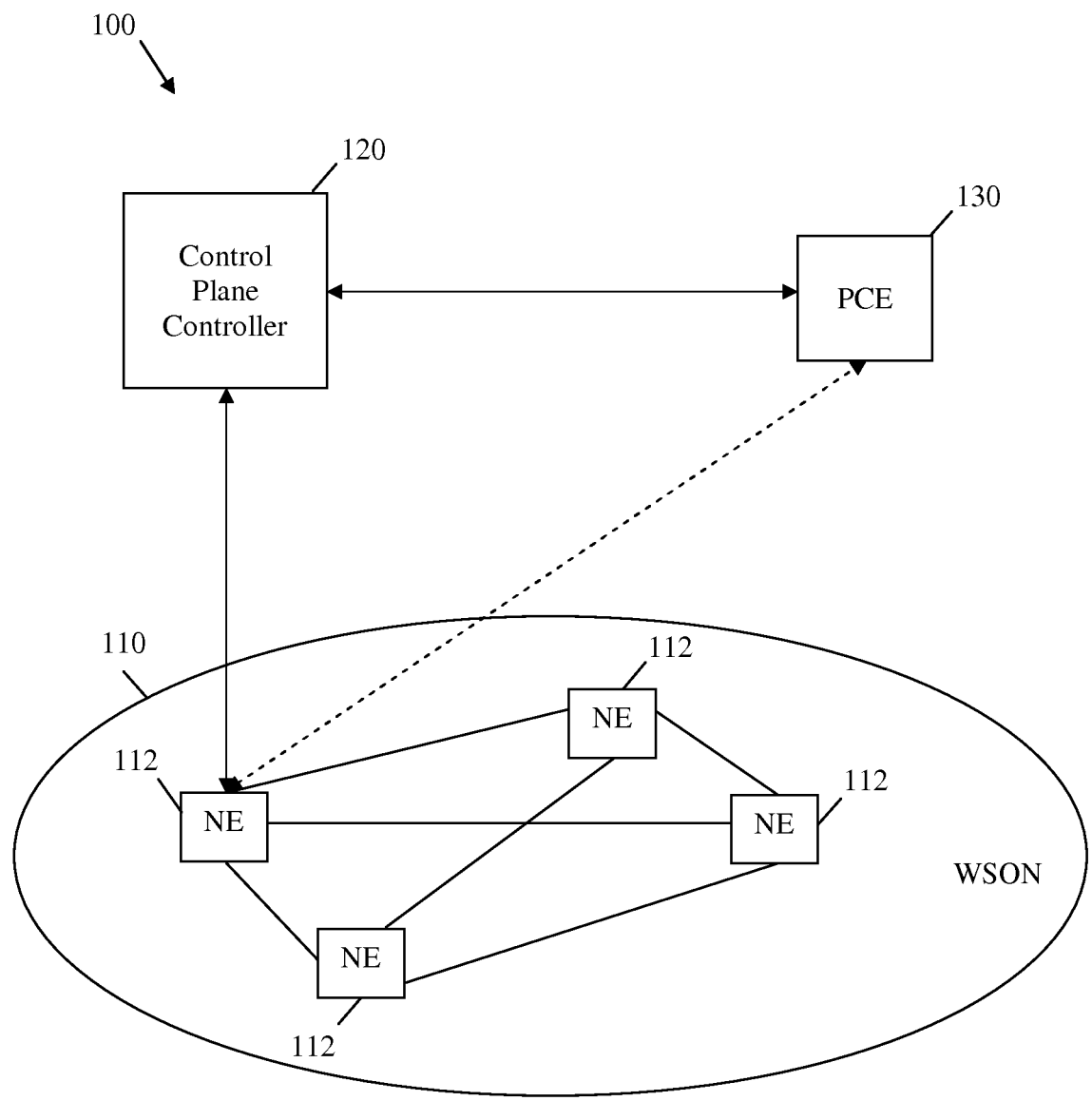
FIG. 1 is a schematic diagram of an embodiment of a WSON system.

FIG. 1 illustrates one embodiment of a WSON system 100. The system 100 may comprise a WSON 110, a control plane controller 120, and a PCE 130. The WSON 110, control plane controller 120, and PCE 130 may communicate with each other via optical, electrical, or wireless means. The WSON 110 may be any optical network that uses active or passive components to transport optical signals. For instance, the WSON 110 may be part of a long haul network, a metropolitan network, or a residential access network. The WSON 110 may implement WDM to transport the optical signals through the WSON 110, and may comprise various optical components including a plurality of NEs 112, which may be coupled to one another using optical fibers. In an embodiment, the optical fibers may also be considered NEs 112. The optical signals may be transported through the WSON 110 over lightpaths that may pass through some of the NEs 112. In addition, some of the NEs 112, for example those at the ends of the WSON 110, may be configured to convert between electrical signals from external sources and the optical signals used in the WSON 110. Although four NEs 112 are shown in the WSON 110, the WSON 110 may comprise any quantity of NEs 112.

The NEs 112, also referred to as nodes, may be any devices or components that transport signals through the WSON 110. In an embodiment, the NEs 112 may consist essentially of optical processing components, such as line ports, add ports, drop ports, transmitters, receivers, amplifiers, optical taps, and so forth, and do not contain any electrical processing components. Alternatively, the NEs 112 may comprise a combination of optical processing components and electrical processing components. At least some of the NEs 112 may be configured with wavelength converters, optical-electrical (OE) converters, electrical-optical (EO) converters, OEO converters, or combinations thereof. However, it may be advantageous for at least some of the NEs 112 to lack such converters, as such may reduce the cost and complexity of the WSON 110. In specific embodiments, the NEs 112 may comprise optical switches such as optical cross connects (OXCs), photonic cross connects (PXCs), type I or type II reconfigurable optical add/drop multiplexers (ROADMs), wavelength selective switches (WSSs), fixed optical add/drop multiplexers (FOADMs), or combinations thereof.

Some NEs 112 may be used for wavelength-based switching by forwarding, adding, or dropping any or all of the wavelengths that are used to transmit the optical signals. For instance, the NE 112 may comprise a plurality of ingress ports, such as line side ingress ports or add ports, a plurality of egress ports, such as line side egress ports or drop ports, or combinations thereof. The add ports and drop ports may also be called tributary ports. The optical signals handled by these various ports may comprise one or a plurality of optical wavelengths. The line side ingress ports may receive the optical signals and send some or all of the optical signals to the line side egress ports, which may in turn transmit the optical signals. Alternatively, the line side ingress ports may redirect some or all of the optical signals to the drop ports, which may drop the optical signals, for example, by transmitting the optical signals outside the optical fibers. The add ports may receive additional optical signals and send the optical signals to some of the line side egress ports, which may in turn transmit the optical signals.

In some instances, the NE 112 may comprise at least one colored port that may be an ingress port or an egress port, which may receive or transmit, respectively, the optical signal at a fixed optical wavelength or a limited range of optical wavelengths, e.g. less then a full range of wavelengths as defined by a standard, such as the course WDM (CWDM) or dense WDM (DWDM) standards, which are discussed below. Additionally or alternatively, the NE may comprise at least one colorless port that may be an ingress port or an egress port, which may receive or transmit, respectively, the optical signal at any one of a plurality of different wavelengths, e.g. a full range of wavelengths as defined by a standard, such as CWDM or DWDM. The NE 112 that comprises a colorless port and supports any or a plurality of variable wavelengths may be referred to as a colorless NE. Alternatively, the NE 112 that does not comprise a colorless port and supports one or a plurality of predetermined (or specified) wavelengths may be referred to as a colored NE. Further, the NE 112 may comprise one or a plurality of wavelength converters (WCs) that may convert one or a plurality of wavelengths between at least one ingress port and one egress port. For instance, a WC may be positioned between an ingress port and an egress port and may be configured to convert a first wavelength received at the ingress port into a second wavelength, which may then be transmitted at the egress port. The WC may comprise any quantity of optical and/or electrical components that may be configured for wavelength conversion, such as an OEO converter and/or a laser.

The NEs 112 may be coupled to each other via optical fibers, also referred to as links. The optical fibers may be used to establish optical links and transport the optical signals between the NEs 112. The optical fibers may comprise standard single mode fibers (SMFs) as defined in International Telecommunication Union (ITU) Telecommunication Standardization Sector (ITU-T) standard G.652, dispersion shifted SMFs as defined in ITU-T standard G.653, cut-off shifted SMFs as defined in ITU-T standard G.654, non-zero dispersion shifted SMFs as defined in ITU-T standard G.655, wideband non-zero dispersion shifted SMFs as defined in ITU-T standard G.656, or combinations thereof. All of the ITU-T standards above are incorporated herein by reference. These fiber types may be differentiated by their optical impairment characteristics, such as attenuation, chromatic dispersion, polarization mode dispersion, four wave mixing, or combinations thereof. These effects may be dependent upon wavelength, channel spacing, input power level, or combinations thereof. The optical fibers may be used to transport WDM signals, such as CWDM signals as defined in ITU-T G.694.2 or DWDM signals as defined in ITU-T G.694.1. All of the standards described in this disclosure are incorporated herein by reference.

The control plane controller 120 may coordinate activities within the WSON 110. Specifically, the control plane controller 120 may receive optical connection requests and provide lightpath signaling to the WSON 110 via an Interior Gateway Protocol (IGP) such as GMPLS, thereby coordinating the NEs 112 such that data signals are routed through the WSON 110 with little or no contention. In addition, the control plane controller 120 may communicate with the PCE 130 using PCE protocol (PCEP) to provide the PCE 130 with information that may be used for the RWA, receive the RWA from the PCE 130, and/or forward the RWA to the NEs 112. The control plane controller 120 may be located in a component outside of the WSON 110, such as an external server, or may be located in a component within the WSON 110, such as a NE 112.

The PCE 130 may perform all or part of the RWA for the WSON system 100. Specifically, the PCE 130 may receive wavelength and/or other information that may be used for the RWA from the control plane controller 120, from the WSON 110, or both. The wavelength information may comprise port wavelength restrictions for the NE 112, such as for a colored NE that comprises a colored port. The PCE 130 may process the information to obtain the RWA, for example, by computing the routes, e.g. lightpaths, for the optical signals, specifying the optical wavelengths that are used for each lightpath, and determining the NEs 112 along the lightpath at which the optical signal should be converted to an electrical signal or a different wavelength. The RWA data may include at least one route for each incoming signal and at least one wavelength associated with each route. The PCE 130 may then send all or part of the RWA data to the control plane controller 120 or directly to the NEs 112. To assist the PCE 130 in this process, the PCE 130 may comprise a global traffic-engineering database (TED), a RWA information database, an optical performance monitor (OPM), a physical layer constraint (PLC) information database, or combinations thereof. The PCE 130 may be located in a component outside of the WSON 110, such as an external server, or may be located in a component within the WSON 110, such as a NE 112.

In some embodiments, the RWA information may be sent to the PCE 130 by a PCC. The PCC may be any client application requesting a path computation to be performed by the PCE 130. The PCC may also be any network component that makes such a request, such as the control plane controller 120, or any NE 112, such as a ROADM or a FOADM.

Figure 2:
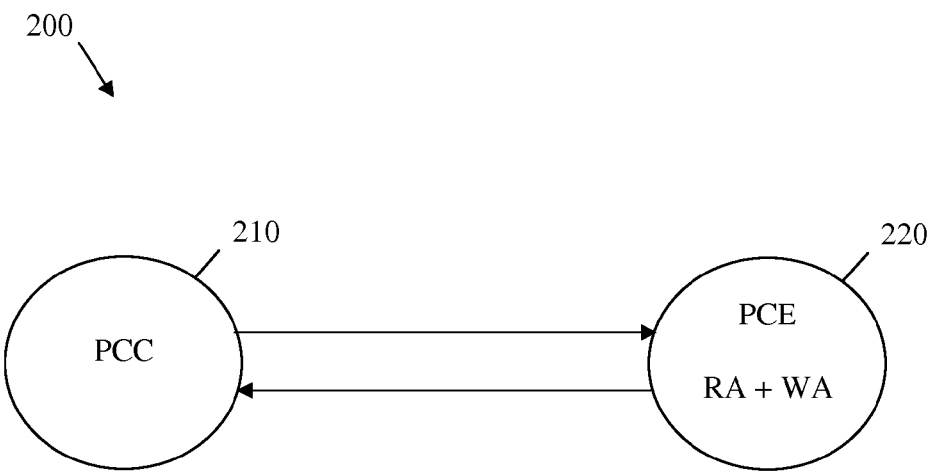
FIG. 2 is a schematic diagram of an embodiment of a combined RWA architecture.

FIG. 2 illustrates an embodiment of a combined RWA architecture 200. In the combined RWA architecture 200, the PCC 210 communicates the RWA request and the required information to the PCE 220, which implements both the routing assignment and the wavelength assignment functions using a single computation entity, such as a processor. For example, the processor may process the RWA information using a single or multiple algorithms to compute the lightpaths as well as to assign the optical wavelengths for each lightpath. The amount of RWA information needed by the PCE 220 to compute the RWA may vary depending on the algorithm used. If desired, the PCE 220 may not compute the RWA until sufficient network links are established between the NEs or when sufficient RWA information regarding the NEs and the network topology is provided. The combined RWA architecture 200 may be preferable for network optimization, smaller WSONs, or both.

Figure 3:
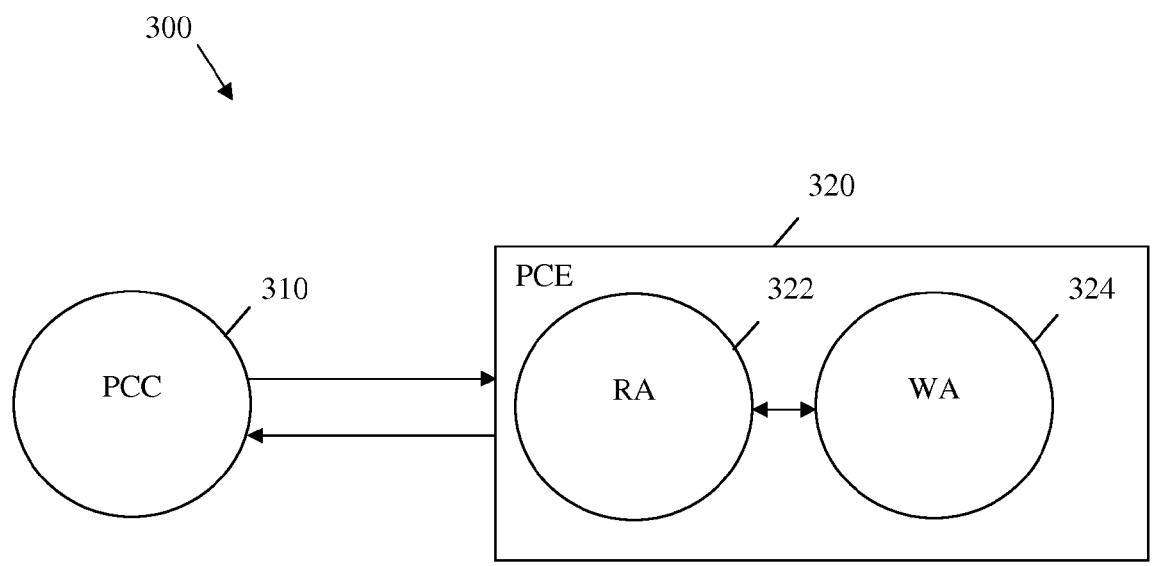
FIG. 3 is a schematic diagram of an embodiment of a separated RWA architecture.

FIG. 3 illustrates an embodiment of a separated RWA architecture 300. In the separated RWA architecture 300, the PCC 310 communicates the RWA request and the required information to the PCE 320, which implements both the routing function and the wavelength assignment function using separate computation entities, such as processors 322 and 324. Alternatively, the separated RWA architecture 300 may comprise two separate PCEs 320 each comprising one of the processors 322 and 324. Implementing routing assignment and wavelength assignment separately may offload some of the computational burden on the processors 322 and 324 and reduce the processing time. In an embodiment, the PCC 310 may be aware of the presence of only one of two processors 322, 324 (or two PCEs) and may only communicate with that processor 322, 324 (or PCE). For example, the PCC 310 may send the RWA information to the processor 322, which may compute the lightpath routes and forward the routing assignment to the processor 324 where the wavelength assignments are performed. The RWA may then be passed back to the processor 322 and then to the PCC 310. Such an embodiment may also be reversed such that the PCC 310 communicates with the processor 324 instead of the processor 322.

In either architecture 200 or 300, the PCC 210 or 310 may receive a route from the source to destination along with the wavelengths, e.g. GMPLS labels, to be used along portions of the path. The GMPLS signaling supports an explicit route object (ERO). Within an ERO, an ERO label sub-object can be used to indicate the wavelength to be used at a particular NE. In cases where the local label map approach is used, the label sub-object entry in the ERO may have to be translated.

Figure 4:
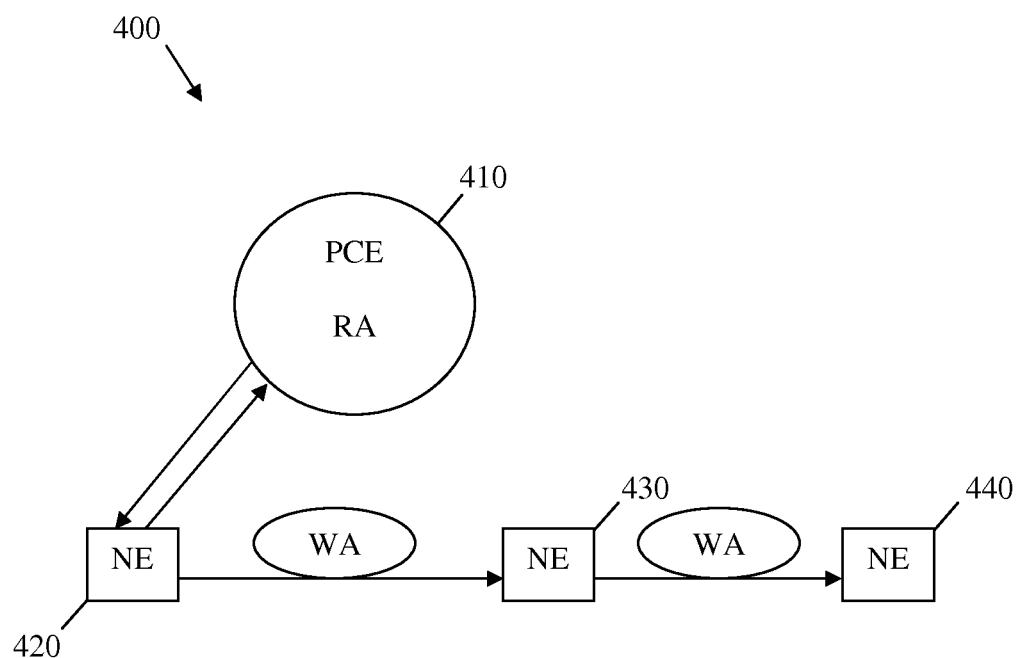
FIG. 4 is a schematic diagram of an embodiment of a distributed wavelength assignment architecture.

FIG. 4 illustrates a distributed wavelength assignment architecture 400. In the distributed wavelength assignment architecture 400, the PCE 410 may receive some or all of the RWA information from the NEs 420, 430, and 440, perhaps via direct link, and implements the routing assignment. The PCE 410 then directly or indirectly passes the routing assignment to the individual NEs 420, 430, and 440, which assign the wavelengths at the local links between the NEs 420, 430, and 440 based on local information. Specifically, the NE 420 may receive local RWA information from the NEs 430 and 440 and send some or all of the RWA information to the PCE 410. The PCE 410 may compute the lightpaths using the received RWA information and send the list of lightpaths to the NE 420. The NE 420 may use the list of lightpaths to identify the NE 430 as the next NE in the lightpath. The NE 420 may establish a link to the NE 430 and use the received local RWA information that may comprise additional constraints to assign a wavelength for transmission over the link. The NE 430 may receive the list of lightpaths from the NE 420, use the list of lightpaths to identify the NE 440 as the next NE in the lightpath, establish a link to the NE 440, and assign the same or a different wavelength for transmission over the link. Thus, the signals may be routed and the wavelengths may be assigned in a distributed manner between the remaining NEs in the network. Assigning the wavelengths at the individual NEs may reduce the amount of RWA information that has to be sent to the PCE 410.

Figure 5:
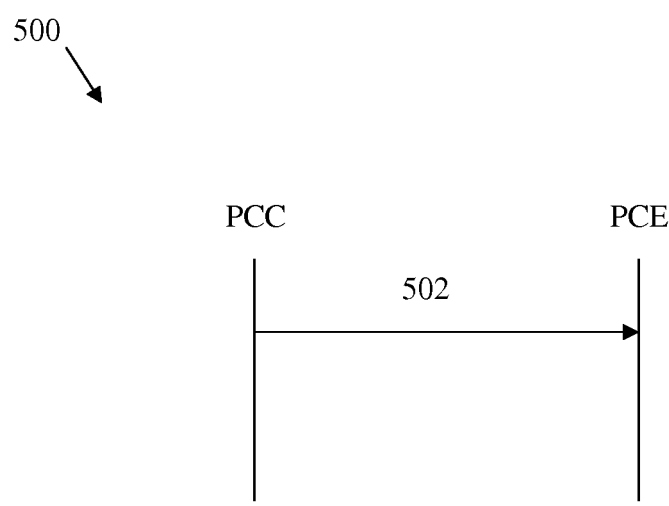
FIG. 5 is a protocol diagram of an embodiment of a PCC and PCE communication method.

FIG. 5 illustrates an embodiment of a communication method 500 between the PCC and the PCE. In the method 500, the PCC sends a message 502 to the PCE, where the message 502 comprises at least some of the RWA information described below. The message 502 may also contain a status indicator that indicates whether the RWA information is static or dynamic. In an embodiment, the status indicator may indicate how long the static or dynamic status lasts so that the PCE can know how long the RWA information is valid and/or when to expect an update. Additionally or alternatively, the message 502 may contain a type indicator that indicates whether the RWA information is associated with a node that may comprise a NE, a link, such as a WDM link, or both. In some instances, an acknowledgement message that confirms receipt of the message 502 may be sent from the PCE to the PCC, e.g. subsequent to receipt of the message 502.

The method 500 may be implemented using any suitable protocol, such as the IGP. The IGP may be a routing protocol used for exchanging route information among gateways, such as a host computer or routers, in an autonomous network. Internet networks can be divided into multiple domains or multiple autonomous systems, where one domain congregates a batch of host computers and routers that employ the same routing protocol. In such a case, the IGP may be provided for selecting routes in a domain. The IGP may be link-state routing protocol in that each node possesses information regarding the complete network topology. In such a case, each node can independently calculate the best next hop from it for every possible destination in the network using local information of the topology. The collection of best next hops may form the routing table for the node. In a link-state protocol, the only information that may be passed between the nodes is information used to construct the connectivity maps. Examples of suitable IGPs include GMPLS, OSPF, and intermediate system to intermediate system (IS-IS).

As mentioned above, the message 502 may comprise RWA information that may be exchanged between the PCC and the PCE. The RWA information may also be exchanged, e.g. via signaling, between any of the NEs and/or between the NEs and the PCE. The exchanged RWA information may comprise a plurality of signal attributes or characteristics that may define or characterize a plurality of WSON signals. The signal compatibility constraints information may also include a plurality of NE signal compatibility constraints, such as regarding the different signal attributes or characteristics. The NE signal compatibility constraints may be transported, e.g. between the NEs, and used, e.g. by the PCE, to determine the different signals that may be processed by the different NEs and calculate suitable paths to transfer compatible signals between the NEs.

The NE signal compatibility constraints may indicate whether the NE is compatible with WSON signals, for instance based on a limited wavelength range, a modulation type restriction (e.g. including FEC coding), a bit rate range restriction, a client signal dependence, or combinations thereof. In an embodiment, the NE signal compatibility constraints information may comprise a modulation type list, a FEC type list, a bit rate range list, and/or an acceptable client signal list. Such information may be routed in GMPLS, for instance using the OSPF protocol and may be associated with one NE or multiple NEs, such as in a resource block (RB) pool. The information may be routed using a plurality of corresponding TLVs or fields, which may be sent in Record Route Objects (RROs) and/or EROs between the NEs.

The modulation type list, also referred to herein as optical tributary signal class, may comprise at least one of an ITU-T standardized modulation type, a vendor specific modulation type, or both. The ITU-T standardized modulation type(s) and/or the vendor specific modulation type(s) may be handled or processed by a NE or a RB pool. For instance, the modulation type list may be represented as:

<modulation-list>::=[<STANDARD-MODULATION>|<VENDOR-MODULATION>] . . . , where STANDARD-MODULATION is an object that indicates an ITU-T standardized optical tributary signal class and VENDOR-MODULATION is an object that indicates a vendor specific modulation type. The modulation-list may comprise any quantity of STANDARD-MODULATION and/or VENDOR-MODULATION objects.

The FEC type list may comprise one or a plurality of FEC types that may be handled or processed by a NE or a RB pool. The FEC type list may be represented as:

<fec-list>::=[<FEC>] . . . , where FEC is an object that indicates an ITU-T standardized FEC type as defined in standard G.709 or standard G.707, both of which are incorporated herein by reference, or a vendor specific FEC type. The fec-list may comprise any quantity of FEC objects.

The bit rate range list may comprise one or a plurality of bit rate ranges that may be handled or processed by a NE or a RB pool. The bit rate range list may be represented as:

<rate-range-list>::=[<rate-range>] . . . , where rate-range is an object that indicates a range of supported bit rate. The rate-range-list may comprise any quantity of rate-range objects, which may be each represented as:

<rate-range>::=[<START-RATE><END-RATE>], where START-RATE is an object that indicates a range start and END-RATE is an object that indicates a range end.

The acceptable client signal list may comprise one or a plurality of signal identifiers that indicate the signals that may be handled or processed by a NE or a RB pool. The acceptable client signal list may be represented as:

<client-signal-list>::=[<GPID>] . . . , where General Protocol Identifier (GPID) is an object that indicates an Internet Engineering Task Force (IETF) standardized GPID value as defined in Request for Comments (RFC) 3471 or RFC 4328, both of which are incorporated herein by reference. The client-signal-list may comprise any quantity of GPID objects.

The IETF RFC 4202, which is incorporated herein by reference, introduces Interface Switching Capability Descriptors (ISCDs) to extend GMPLS routing. For instance, the IETF RFC 4202 describes a Lambda-Switch Capable (LSC) descriptor for routing any additional information in GMPLS. The IETF RFC 4202 and RFC 5307, both of which are incorporated herein by reference, also define a plurality of TLVs for ISCDs, including a Switching Capability-specific information TLV or sub-TLV. However, none of the RFCs specifies any of the NE signal compatibility constraints information described above. In an embodiment, GMPLS routing, for instance based on OSPF, may be extended using a plurality of TLVs and/or LSC ISCDs that comprise the NE signal compatibility constraints described above.

Figure 6:
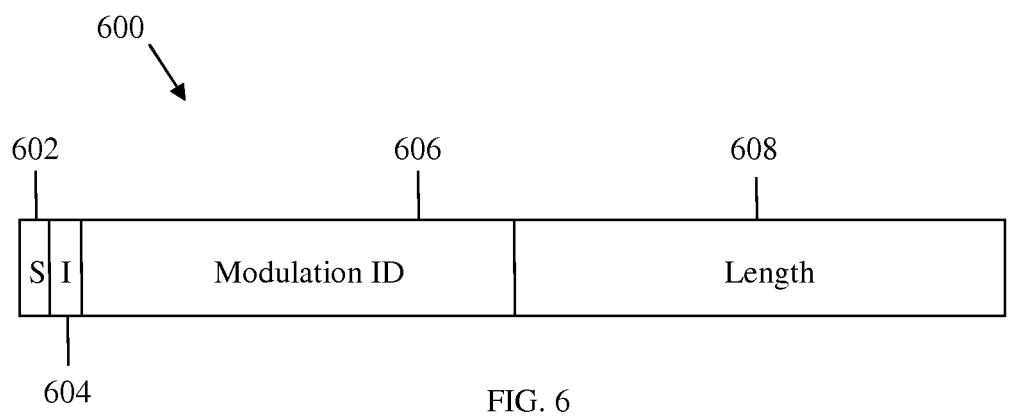
FIG. 6 is a schematic diagram of an embodiment of a modulation type list header.

FIG. 6 illustrates one embodiment of a modulation type list header 600 in a modulation type list TLV that may be forwarded between the NEs via GMPLS or OSPF routing. The modulation type list header 600 may comprise a standardized modulation (S) bit 602, an input modulation format (I) bit 604, a modulation identifier (ID) 606, and a length field 608. In an embodiment, the modulation type list header 600 may have a size of about 32 bits. The S bit 602 may be set, e.g. to about one, to indicate a standardized modulation format or may be set, e.g. comprise about zero, to indicate a vendor specific modulation format. The I bit 604 may be set, e.g. to about one, to indicate an input modulation format and/or a sink modulation type or may not be set, e.g. to about zero, to indicate an output modulation format and/or a source modulation type. The modulation ID 606 may comprise a unique ID associated with one modulation format/type. The length field 608 may indicate the entire size of the modulation type list TLV.

Figure 7:
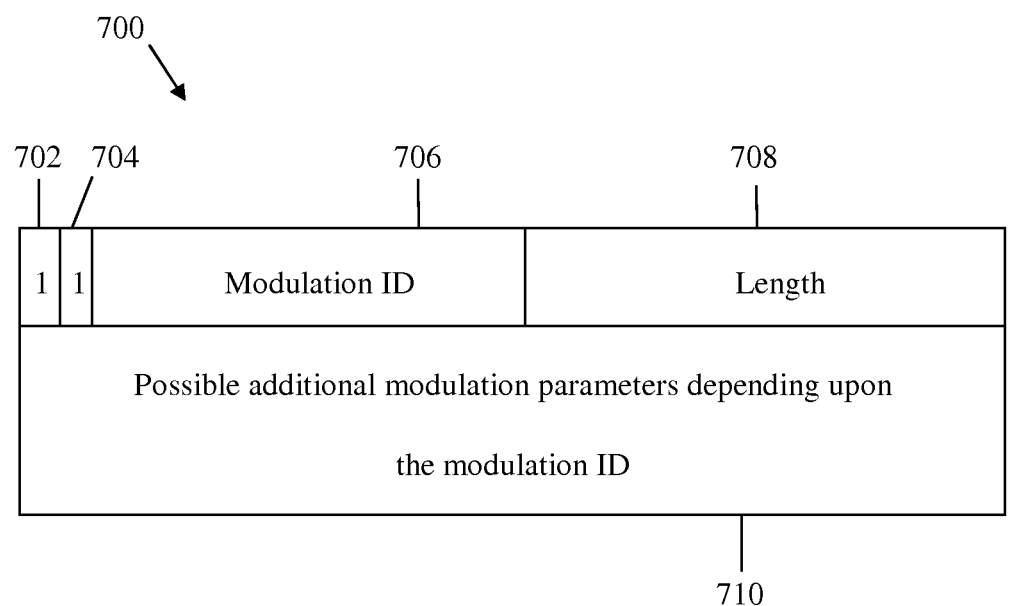
FIG. 7 is a schematic diagram of an embodiment of a modulation type list Type-Length-Value (TLV).

FIG. 7 illustrates one embodiment of a modulation type list TLV 700, which may include the modulation type list header 600. The modulation type list TLV 700 may comprise an S bit 702, an I bit 704, a modulation ID 706, and a length field 708, which may be similar to the corresponding fields in modulation type list header 600. The modulation type list TLV 700 may also comprise at least one field 710 than includes additional modulation parameters based on the modulation ID 706. Specifically, the modulation type list TLV 700 may correspond to a standardized modulation format. As such, the S bit 702 may be set, e.g. to about one. The modulation ID 706 may comprise a value of about one to indicate an optical tributary signal class non-return to zero (NRZ) 1.25 gigabits per second (G), a value of about two to indicate an optical tributary signal class NRZ 2.5G, a value of about three to indicate an optical tributary signal class NRZ 10G, a value of about four to indicate an optical tributary signal class NRZ 40G, or a value of about five to indicate an optical tributary signal class return to zero (RZ) 40G. Alternatively, the modulation ID 706 may comprise a reserved value of about zero. The field 710 may indicate allowable modulation types in the source (transmitter) and/or the sink (receiver).

Figure 8:
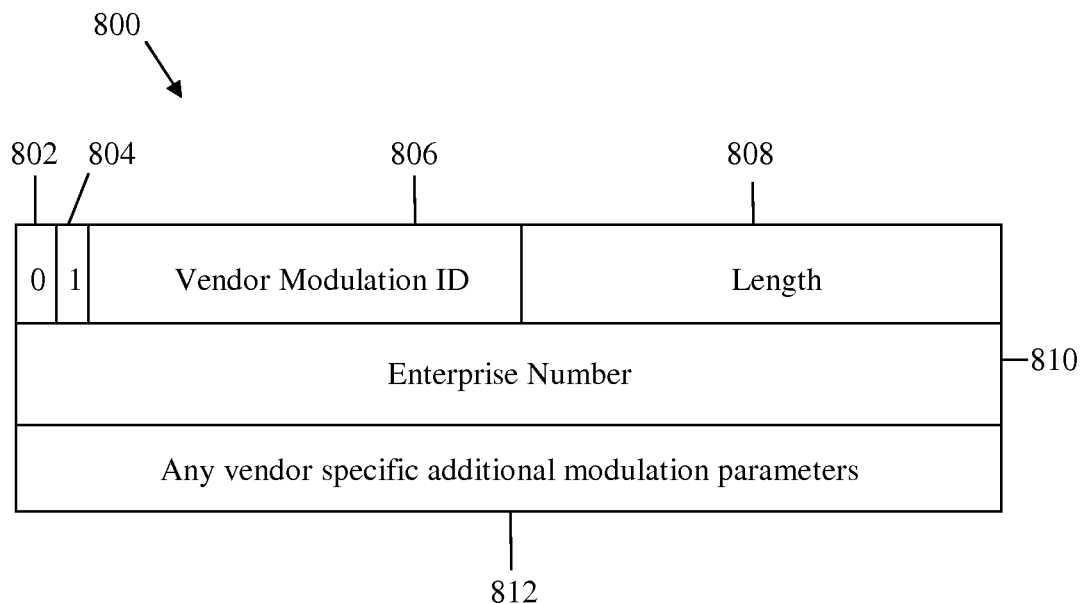
FIG. 8 is a schematic diagram of another embodiment of a modulation type list TLV.

FIG. 8 illustrates another embodiment of a modulation type list TLV 800, which may include the modulation type list header 600. The modulation type list TLV 800 may comprise an S bit 802, an I bit 804, and a length field 808, which may be similar to the corresponding fields in modulation type list header 600. The modulation type list TLV 800 may also comprise a vendor modulation ID 806, an enterprise number 810, and at least one field 812 that includes vendor specific additional modulation parameters. Specifically, the modulation type list TLV 800 may correspond to vendor specific modulation format. As such, the S bit 802 may be set, e.g. to about zero. The vendor modulation ID 806 may comprise an assigned ID for the modulation type, e.g. for a vendor. The enterprise number 810 may comprise a unique identifier of an organization and may comprise about 32 bits. The enterprise numbers may be assigned by the Internet Assigned Numbers Authority (IANA) and managed through IANA registry, e.g. according to RFC 2578, which is incorporated herein by reference. The field 812 may comprise additional parameters that characterize vendor specific modulation.

Figure 9:
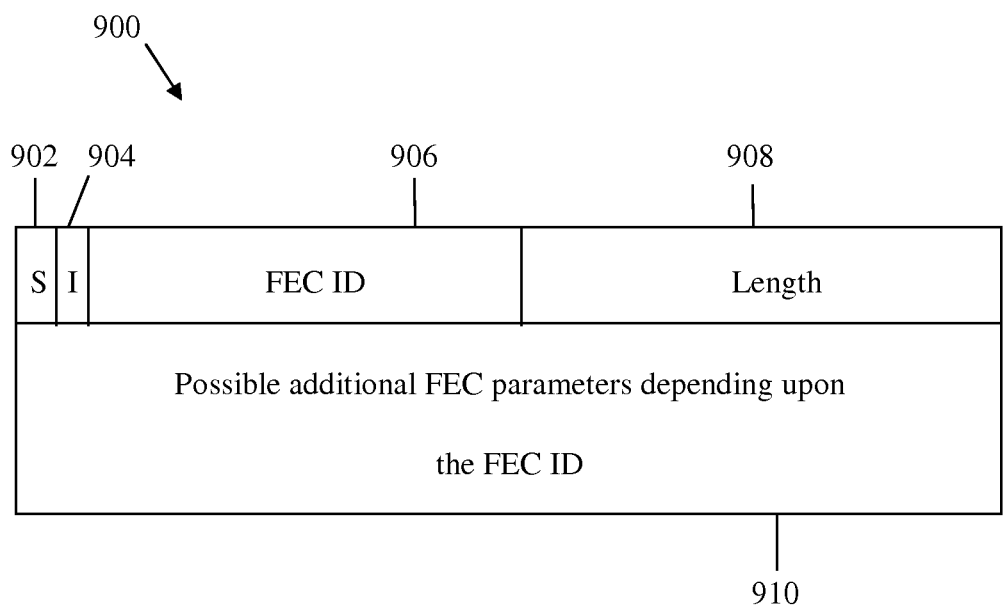
FIG. 9 is a schematic diagram of an embodiment of a FEC type list TLV.

FIG. 9 illustrates one embodiment of a FEC type list TLV 900 that may be forwarded between the NEs via GMPLS or OSPF routing. The FEC type list TLV 900 may comprise an S bit 902, an input FEC format (I) bit 904, a FEC ID 906, a length field 908, and at least one field 910 that includes additional FEC parameters based on the FEC ID 906. The S bit 902 may be set, e.g. to about one, to indicate a standardized FEC format or may be set, e.g. comprise about zero, to indicate a vendor specific FEC format. The I bit 904 may be set, e.g. to about one, to indicate an input FEC format and/or a sink FEC type or may not be set, e.g. to about zero, to indicate an output FEC format and/or a source FEC type. The FEC ID 906 may comprise a unique ID associated with one FEC format/type. The length field 908 may indicate the entire size of the FEC type list TLV 900.

Figure 10:
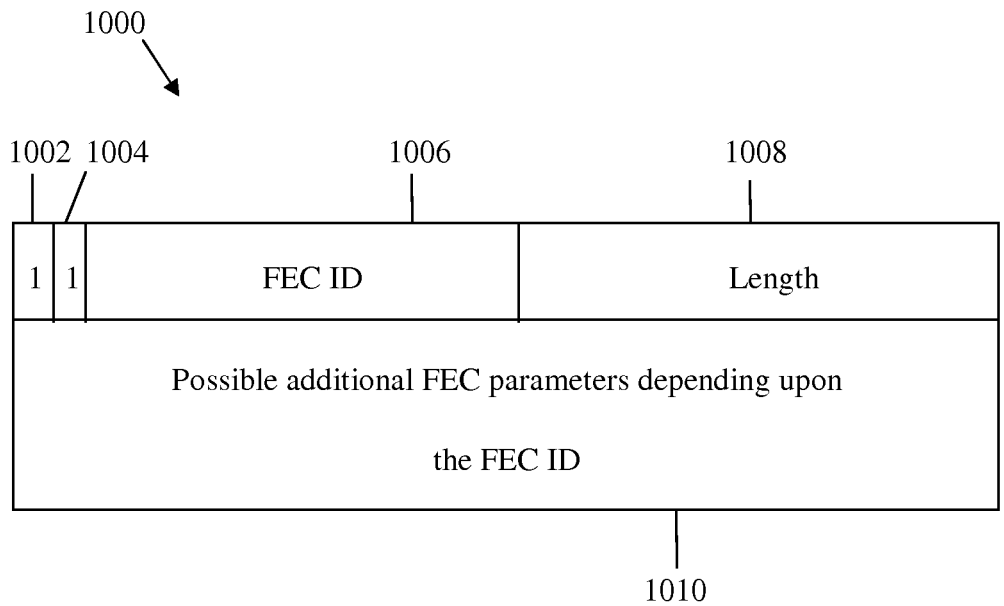
FIG. 10 is a schematic diagram of another embodiment of a FEC type list TLV.

FIG. 10 illustrates another embodiment of a FEC type list TLV 1000 that may be forwarded between the NEs via GMPLS or OSPF routing. The FEC type list TLV 1000 may comprise an S bit 1002, an I bit 1004, and a length field 1008, which may be similar to the corresponding components of the FEC type list TLV 900. The FEC type list TLV 1000 may also comprise a FEC ID 1006 and at least one field 1010 that includes additional FEC parameters based on the FEC ID 1006. Specifically, the FEC type list header 1000 may correspond to a standardized FEC format. As such, the S bit 1002 may be set, e.g. to about one. The FEC ID 1006 may comprise a value of about one to indicate an ITU-T G.709 Reed-Solomon FEC or a value of about two to indicate an ITU-T G.907V compliant Ultra FEC. The FEC 1006 may comprise a value of about three to indicate an ITU-T G.975.1 Concatenated FEC (RS(255,239)/CSOC(n0/k0=7/6,j=8)), a value of about four to indicate a G.975.1 Concatenated FEC (Bose-Chaudhuri-Hocquengham or BCH(3860,3824)/BCH(2040, 1930)), a value of about five to indicate a G.975.1 Concatenated FEC (RS(1023,1007)/BCH(2407,1952)), or a value of about six to indicate a G.975.1 Concatenated FEC (RS(1901, 1855)/Extended Hamming Product Code (512,502)X(510, 500)). The FEC 1006 may comprise a value of about seven to indicate a G.975.1 low density parity check (LDPC) Code, a value of about eight to indicate a G.975.1 Concatenated FEC (Two orthogonally concatenated BCH codes), a value of about nine to indicate a G.975.1 RS(2720,2550), or a value of about 10 to indicate a G.975.1 Concatenated FEC (Two interleaved extended BCH(1020,988) codes). The standards G.709V and G.975.1 are both incorporated herein by reference. Alternatively, the FEC ID 1006 may comprise a reserved value of about zero. The field 1010 may indicate allowable FEC types in the source (transmitter) and/or the sink (receiver).

Figure 11:
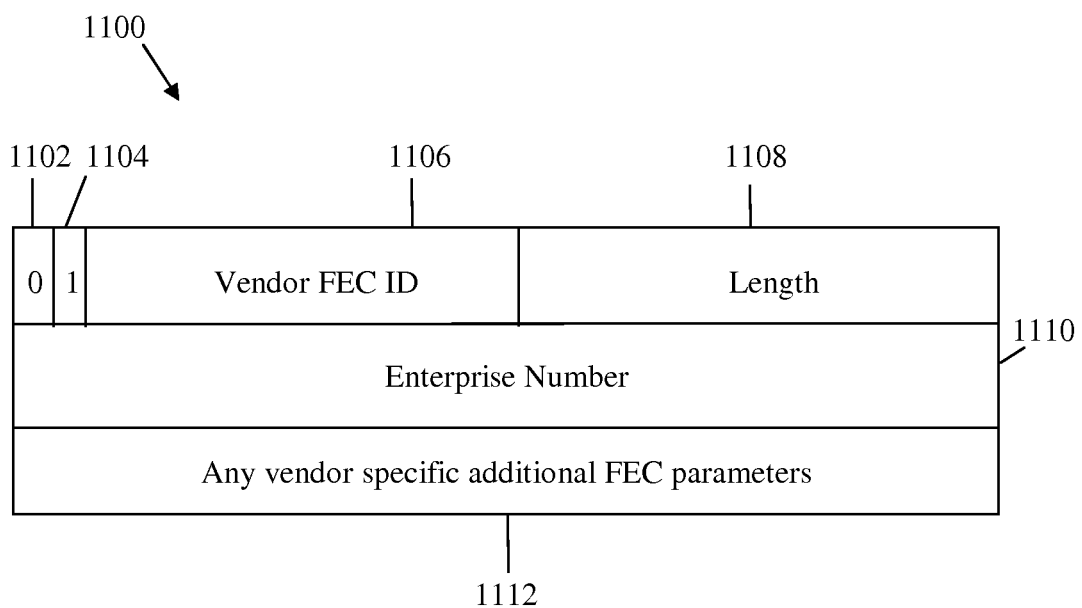
FIG. 11 is a schematic diagram of another embodiment of a FEC type list TLV.

FIG. 11 illustrates another embodiment of a FEC type list TLV 1100 that may be forwarded between the NEs via GMPLS or OSPF routing. The FEC type list TLV 1100 may comprise an S bit 1102, an I bit 1104, and a length field 1108, which may be similar to the corresponding components of the FEC type list TLV 900. The FEC type list TLV 1100 may also comprise a vendor FEC ID 1106, an enterprise number 1110, and at least one field 1112 that includes vendor specific additional FEC parameters. Specifically, the FEC type list TLV 1100 may correspond to vendor specific FEC format. As such, the S bit 1102 may be set, e.g. to about zero. The vendor FEC ID 1106 may comprise a vendor assigned ID for the FEC type. The enterprise number 1110 may comprise a unique identifier of an organization and may comprise about 32 bits. The enterprise numbers may be assigned by IANA and managed through IANA registry, e.g. according to RFC 2578. The field 1112 may comprise additional parameters that characterize vendor specific FEC.

Figure 12:
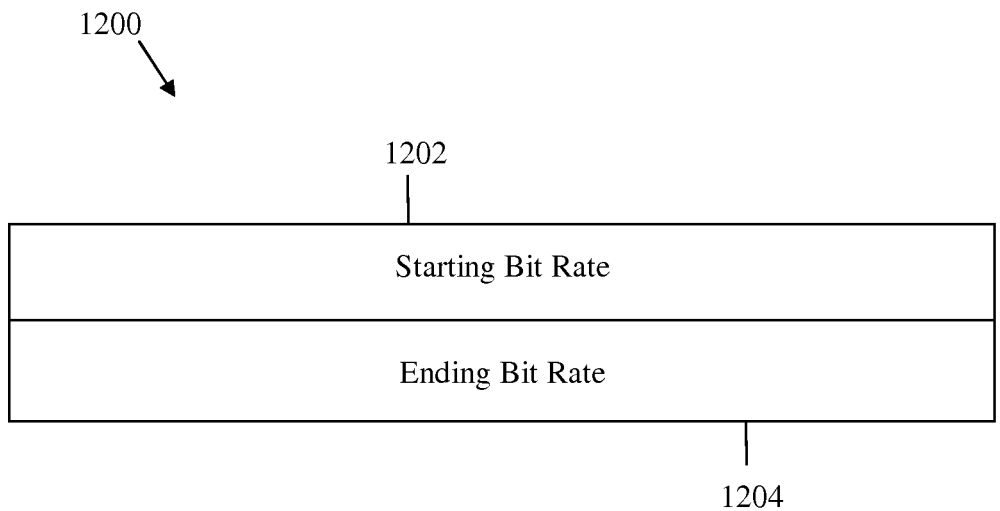
FIG. 12 is a schematic diagram of an embodiment of a bit rate range field.

FIG. 12 illustrates one embodiment of a bit rate range field 1200 in a bit rate range list TLV that may be forwarded between the NEs via GMPLS or OSPF routing. The bit rate range field 1200 may comprise a starting bit rate 1202 and an ending bit rate 1204. The starting bit rate 1202 and the ending bit rate 1204 may indicate the starting bit rate and ending bit rate, e.g. in bits per second, in a bit rate range that may be supported by a NE. The starting bit rate 1202 and the ending bit rate 1204 may each comprise about 32 bit Institute of Electrical and Electronics Engineers (IEEE) floating point numbers. Further, the starting bit rate 1204 may comprise a smaller number than the ending bit rate 1204.

Figure 13:
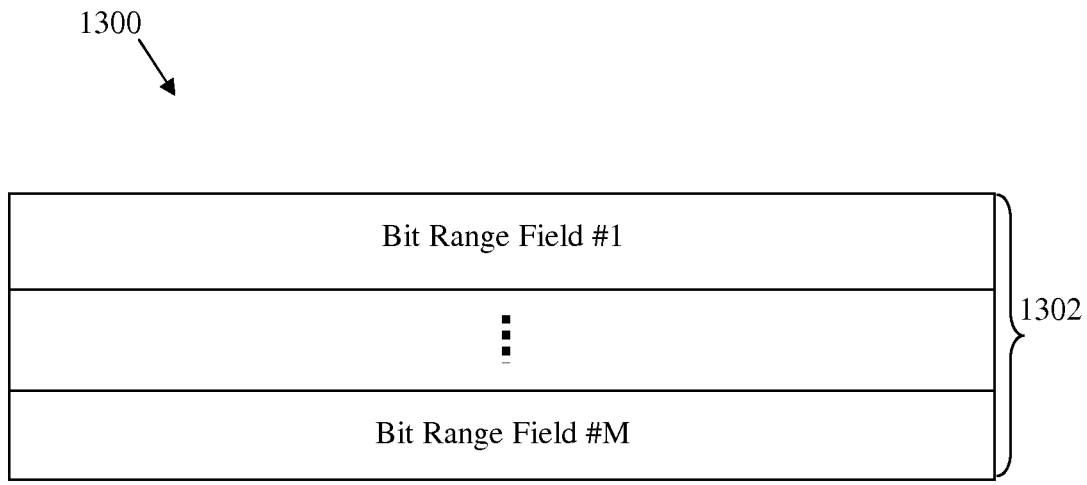
FIG. 13 is a schematic diagram of an embodiment of a bit rate range list TLV.

FIG. 13 illustrates one embodiment of a bit rate range list TLV 1300, which may comprise at least on bit range field 1302. Each bit range field 1302 may be substantially similar to the bit rate range field 1200 and may indicate a different bit rate range that may be supported by the NE. For instance, each bit range field 1302 may indicate a different starting bit rate and a different ending bit rate. The different bit rate ranges indicated in the bit rate range list TLV 1300 may or may not overlap.

Figure 14:
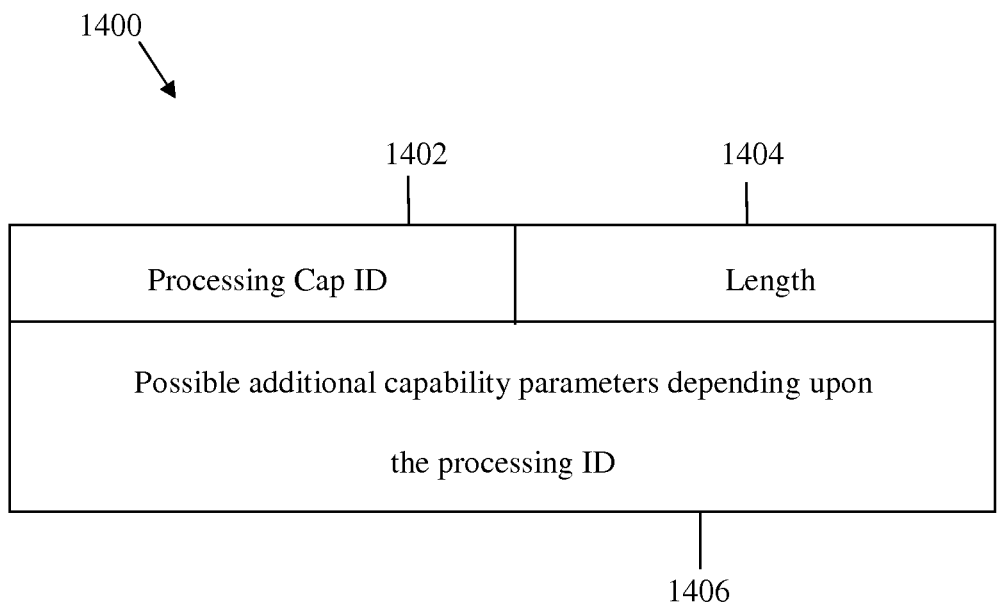
FIG. 14 is a schematic diagram of an embodiment of a processing capability list TLV.

FIG. 14 illustrates one embodiment of a processing capability list TLV 1400 that may be forwarded between the NEs via GMPLS or OSPF routing. The processing capability list TLV 1400 may comprise a processing capability (Cap) ID 1402, a length field 1404, and at least one field 1406 that includes additional capability parameters based on the processing capability ID 1402. The processing capability ID 1402 may comprise a unique ID associated with one processing capability for a NE. For instance, the processing capability ID 1402 may indicate one of a regeneration capability, a fault and performance monitoring, or other NE processing capability. The length field 1404 may indicate the entire size of the processing capability list TLV 1400. The field 1406 may comprise at least one additional capability parameter, as described below.

Figure 15:
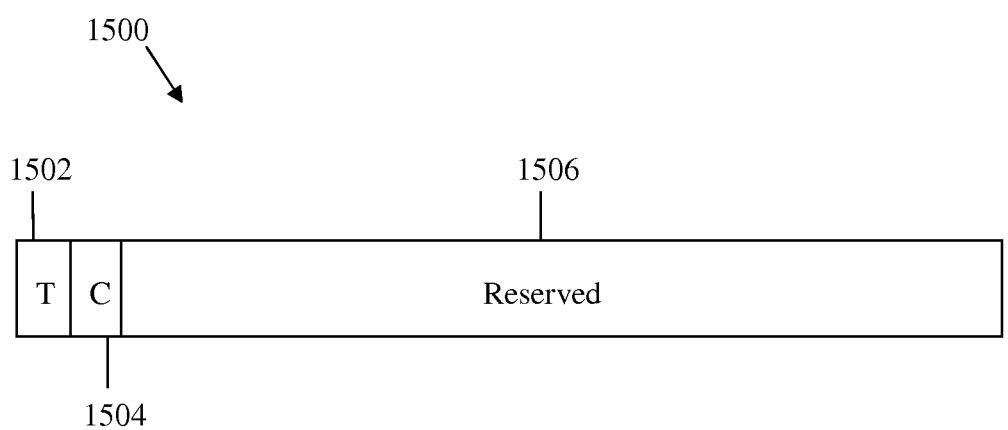
FIG. 15 is a schematic diagram of an embodiment of an additional capability parameter.

FIG. 15 illustrates one embodiment of an additional capability parameter 1500 that may be included in the processing capability list TLV 1400, e.g. in the field 1406. The additional capability parameter 1500 may indicate additional processing capability information that may be associated with the processing capability ID 1402. For instance, the processing capability parameter 1500 may be added to the processing capability list TLV 1400 if the processing capability ID 1402 indicates a regeneration capability. The additional capability parameter 1500 may comprise a type (T) field 1502, a capability (C) field 1504, and a reserved field 1506. The T field 1502 may indicate the regenerator type of the associated NE. The T field 1502 may comprise a value of about one to indicate a 1R regenerator type, a value of about two to indicate a 2R regenerator type, a value of about three to indicate a 3R regenerator type, or a value of about four to indicate a 4R regenerator type. Alternatively, the T field 1502 may comprise a reserved value of about zero.

The C field 1504 may indicate the capability of the associated regenerator or NE. The C field 1504 may comprise a value of about one to indicate a fixed regeneration point or a value of about two to indicate a selective regeneration pool(s). In the case of selective regeneration pool(s), regeneration pool properties such as ingress and/or egress restriction and availability information may be needed. Such information may be provided in other TLVs. Alternatively, the C field 1504 may comprise a reserved value of about zero. The reserved field 1506 may be reserved and may not be used.

Figure 16:
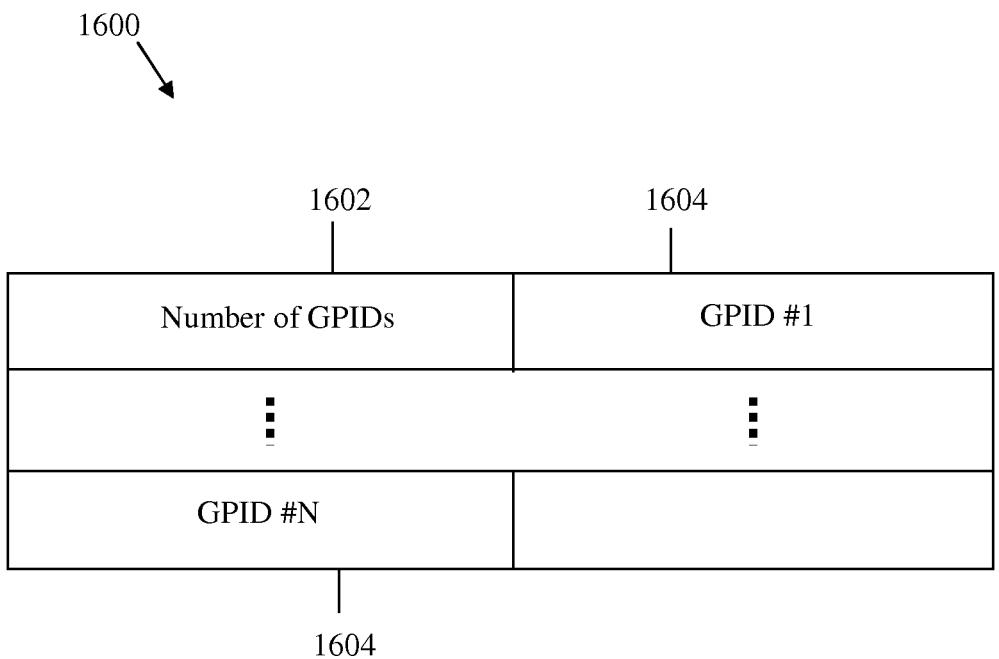
FIG. 16 is a schematic diagram of an embodiment of a client signal list TLV.

FIG. 16 illustrates one embodiment of a client signal list TLV 1600 that may be forwarded between the NEs via GMPLS or OSPF routing. The client signal list TLV 1600 may comprise a number of GPIDs 1602 and at least one GPID 1604. The number of GPIDs 1602 may specify the quantity of GPIDs 1604 included in the client signal list TLV 1600 and each GPID 1604 may comprise an integer greater or equal to about one. Each GPID 1604 may indicate a specific client signal format, which may be assigned by IANA, such as specified in RFC 3471 and RFC 4328.

Figure 17:
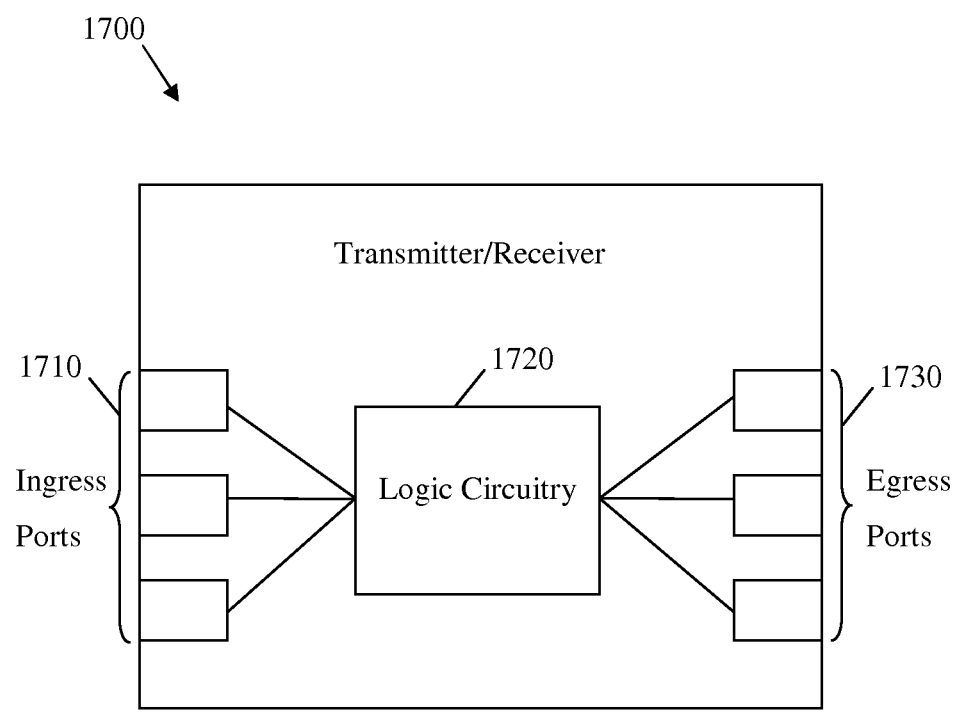
FIG. 17 is a schematic diagram of an embodiment of a transmitter/receiver unit.

FIG. 17 illustrates an embodiment of a transmitter/receiver unit 1700, which may be located at or coupled to any of the NEs in the WSON. The transmitter/receiver unit 1700 may be any device that transports frames through the WSON. For instance, the transmitter/receiver unit 1700 may correspond to or may be located in a network node, which may comprise a regenerator, an OEO switch, a wavelength converter, an OXC, a PXC, a type I or type II ROADM, a WSS, a FOADM, or combinations thereof. The node may include bridges, switches, routers, or various combinations of such devices. The transmitted/receiver unit 1700 may comprise a plurality of ingress ports or units 1710 for receiving frames, objects, or TLVs from other nodes, logic circuitry 1720 to determine which nodes to send the frames to, and a plurality of egress ports or units 1730 for transmitting frames to the other nodes.

Figure 18:
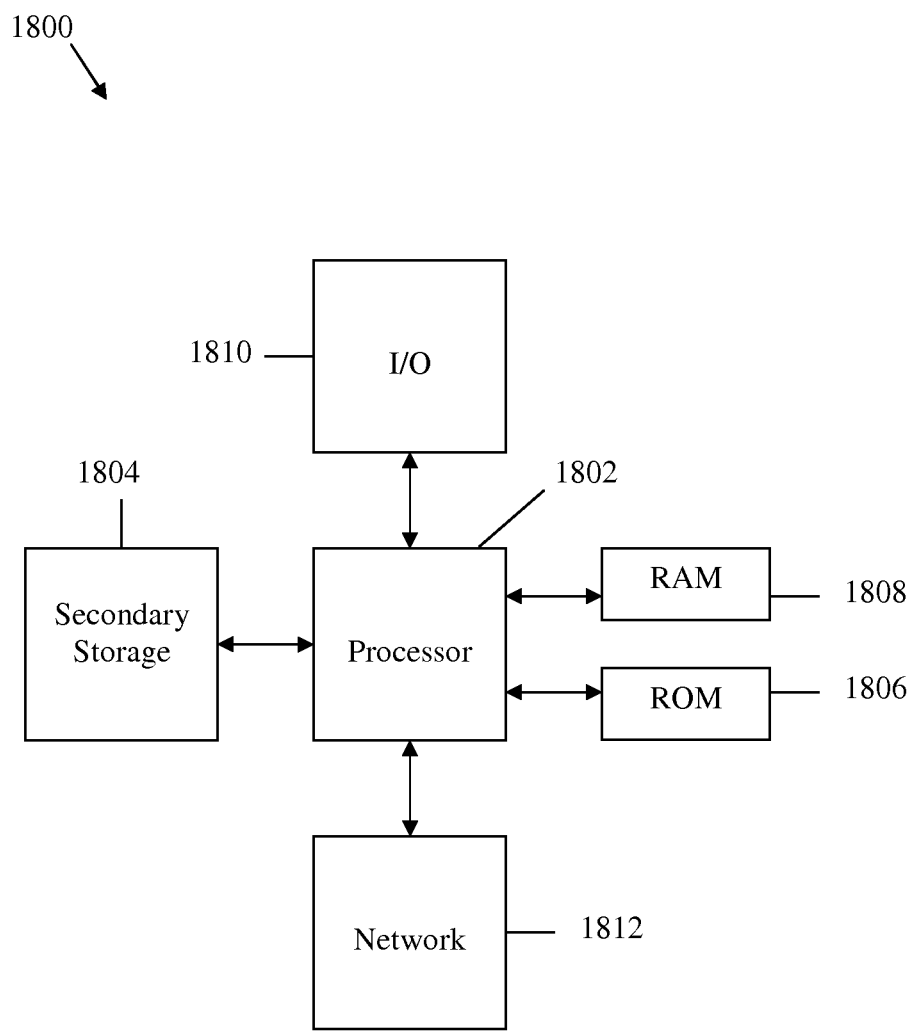
FIG. 18 is a schematic diagram of an embodiment of a general-purpose computer system.

The network components described above may be implemented on any general-purpose network component, such as a computer or network component with sufficient processing power, memory resources, and network throughput capability to handle the necessary workload placed upon it. FIG. 18 illustrates a typical, general-purpose network component 1800 suitable for implementing one or more embodiments of the components disclosed herein. The network component 1800 includes a processor 1802 (which may be referred to as a central processor unit or CPU) that is in communication with memory devices including secondary storage 1804, read only memory (ROM) 1806, random access memory (RAM) 1808, input/output (I/O) devices 1810, and network connectivity devices 1812. The processor 1802 may be implemented as one or more CPU chips, or may be part of one or more application specific integrated circuits (ASICs).

The secondary storage 1804 is typically comprised of one or more disk drives or tape drives and is used for non-volatile storage of data and as an over-flow data storage device if RAM 1808 is not large enough to hold all working data. Secondary storage 1804 may be used to store programs that are loaded into RAM 1808 when such programs are selected for execution. The ROM 1806 is used to store instructions and perhaps data that are read during program execution. ROM 1806 is a non-volatile memory device that typically has a small memory capacity relative to the larger memory capacity of secondary storage. The RAM 1808 is used to store volatile data and perhaps to store instructions. Access to both ROM 1806 and RAM 1808 is typically faster than to secondary storage 1804.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g. from about 1 to about 10 includes 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An apparatus comprising:
a network element (NE) configured to support routing-associated signal compatibility constraint information that is associated with the NE using Generalized Multi-Protocol Label Switching (GMPLS) and an open shortest path first (OSPF) routing protocol,
wherein the signal compatibility constraint information comprises an acceptable client signal list, and
wherein the signal compatibility constraint information describes whether a signal is compatible with a resource block (RB) pool comprising a plurality of NEs.

2. The apparatus of claim 1, wherein the signal compatibility constraint information further comprises a processing capability list, a modulation type list, a Forward Error Correction (FEC) type list, and a bit rate range list.

3. The apparatus of claim 1, wherein the signal compatibility constraint information corresponds to at least one of a regenerator, an optical-electrical-optical (OEO) switch, and a wavelength converter.

4. The apparatus of claim 3, wherein the regenerator is a 1R regenerator, a 2R regenerator, a 3R regenerator, or a 4R regenerator.

5. The apparatus of claim 3, wherein the regenerator is a fixed regeneration point or a selective regeneration pool.

6. The apparatus of claim 1, wherein the acceptable client signal list indicates a plurality of General Protocol Identifiers (GPIDs).

7. The apparatus of claim 1, wherein the signal compatibility constraint information further comprises a plurality of standardized signal compatibility constraints, a plurality of vendor specific signal compatibility constraints, or both.

8. A network component comprising:
a transmitter unit configured to transmit signal compatibility constraints via Generalized Multi-Protocol Label Switching (GMPLS) open shortest path first (OSPF) routing,
wherein the signal compatibility constraints comprise a modulation type list, a Forward Error Correction (FEC) type list, a bit rate range list, and an acceptable client signal list, and
wherein the signal compatibility constraints describe whether a signal is compatible with a network element (NE).

9. The network component of claim 8, wherein the signal compatibility constraints are subsequently used to implement routing and wavelength assignment (RWA), path computation, or both to a path compatible with the signal compatibility constraints.

10. The network component of claim 8, wherein the signal compatibility constraints are signaled in GMPLS using an explicit route object (ERO).

11. The network component of claim 8, wherein the signal compatibility constraints are signaled in GMPLS using a Record Route Object (RRO).

12. The network component of claim 8, wherein the signal compatibility constraints further comprise a processing capability list.

13. The network component of claim 8, wherein the transmitter unit further transmits a plurality of signal attributes or characteristics that are subsequently processed with the signal compatibility constraints.

14. A method comprising:
receiving a plurality of signal compatibility constraints and signal characteristics for a network element (NE) in a wavelength switched optical network (WSON) via Generalized Multi-Protocol Label Switching (GMPLS) open shortest path first (OSPF) routing,
wherein the signal compatibility constraints comprise an acceptable client signal list,
wherein the client signal list is received in a client signal list Type-length-Value (TLV) that comprises a number of General Protocol Identifiers (GPIDs) field and at least one GPID indicating a specific client signal format.

15. The method of claim 14, wherein the signal compatibility constraints further comprise a modulation type list, and wherein the modulation type list is received in a modulation type list Type-Length-Value (TLV) that comprises a standardized modulation (S) bit, an input modulation format (I) bit, a modulation identifier (ID), a length field, at least one field that comprises a modulation parameter based on the modulation ID, and an enterprise number if the S bit indicates a vendor specific modulation format.

16. The method of claim 14, wherein the signal compatibility constraints further comprise a Forward Error Correction (FEC) type list, and wherein the FEC type list is received in a FEC type list Type-Length-Value (TLV) that comprises a standardized modulation (S) bit, an input FEC format (I) bit, a FEC identifier (ID), a length field, at least one field that comprises a modulation parameter based on the modulation ID, and an enterprise number if the S bit indicates a vendor specific FEC format.

17. The method of claim 14, wherein the signal compatibility constraints further comprise a bit range list, and wherein the bit rate range list is received in a bit rate range list Type-Length-Value (TLV) that comprises at least one bit range field, wherein the bit range field comprises a starting bit rate and an ending bit rate.

18. The method of claim 14, wherein the signal compatibility constraints further comprise a processing capability list, and wherein the processing capability list is received in a processing capability list Type-Length-Value (TLV) that comprises a processing capability identifier (ID), a length field, and at least one field that comprises a capability parameter based on the processing capability ID, wherein the capability parameter comprises a type (T) field, a capability (C) field, and a reserved field if the processing capability ID indicates a regeneration capability.

* * * * *